United States Patent
Tarasuk et al.

(10) Patent No.: US 8,307,787 B2
(45) Date of Patent: Nov. 13, 2012

(54) DISPOSABLE PET CLEANING BAG

(76) Inventors: Christina Ann Tarasuk, Germantown, MD (US); Mary Tarasuk, Derwood, MD (US); Paul Tarasuk, Derwood, MD (US)

(*) Notice: Subject to any disclaimer, the term of this patent is extended or adjusted under 35 U.S.C. 154(b) by 441 days.

(21) Appl. No.: 12/214,869

(22) Filed: Jun. 23, 2008

(65) Prior Publication Data

US 2008/0314330 A1 Dec. 25, 2008

Related U.S. Application Data

(60) Provisional application No. 60/936,851, filed on Jun. 22, 2007.

(51) Int. Cl.
*A01K 29/00* (2006.01)

(52) U.S. Cl. .......................................... 119/651

(58) Field of Classification Search ............. 119/650, 119/651, 671, 673, 850, 907; 383/41, 66, 383/67, 72, 75, 102, 111, 117, 119
See application file for complete search history.

(56) References Cited

U.S. PATENT DOCUMENTS

| | | | | |
|---|---|---|---|---|
| 3,108,568 | A * | 10/1963 | Whitney et al. | 119/174 |
| 3,150,641 | A * | 9/1964 | Kesh | 119/678 |
| 3,263,653 | A * | 8/1966 | Miller | 119/673 |
| 3,749,064 | A * | 7/1973 | Weinstein et al. | 119/664 |
| 4,083,328 | A * | 4/1978 | Baker | 119/673 |
| 4,144,845 | A * | 3/1979 | Sneider | 119/678 |
| 5,060,597 | A * | 10/1991 | Fredericks | 119/678 |
| 5,279,257 | A * | 1/1994 | Temby | 119/676 |
| 5,309,866 | A * | 5/1994 | Santoro | 119/650 |
| 5,373,812 | A * | 12/1994 | Garcia Lopez | 119/671 |
| 6,170,438 | B1 * | 1/2001 | Marwah et al. | 119/600 |

* cited by examiner

*Primary Examiner* — Richard Price, Jr.

(57) ABSTRACT

A single use and disposable pet cleaning bag that is coated on the inside with a dry shampoo or a water-activated shampoo or pre-moistened with a wet shampoo on the inside or throughout the bag. The caretaker places the bag around the pet and massages the shampoo into the coat of the animal, allowing for a much easier method of cleaning pets while providing a safer, more relaxing experience for the animal. When the cleaning is complete, the caretaker removes the bag which contains the dirt and hair that is shed by the animal and discards the bag, eliminating the required cleanup of the bathing area.

17 Claims, 10 Drawing Sheets

DISPOSABLE PET CLEANING BAG

COPENDING APPLICATIONS

This application claims priority benefit of the U.S. provisional patent application No. 60/936,851 filed on Jun. 22, 2007.

BACKGROUND

I. Field

This invention relates to a single use, disposable bag to be used for cleaning animals.

II. Background

The current practices for cleaning pets such as dogs, cats or any animals have many disadvantages for animals and for their caretakers.

A disadvantage of using liquid shampoo in combination with wetting an animal with water is that a basin, a bathtub or the like is required in order to bathe the animal indoors. This leaves the caretaker with the job of cleaning the dirt and pet hair that is left behind when the bathing of the animal has been completed.

Another disadvantage of using liquid shampoo in combination with wetting an animal is that bathing an animal in a bathtub or the like can be a difficult, dangerous and messy task if the animal is unruly, does not want to be bathed and tries to escape from the basin. Often the pet will slip and fall or scratch the caretaker when trying to escape.

Another disadvantage of using liquid shampoo in combination with wetting an animal is that it can be a dangerous, painful or harmful experience for geriatric animals when they must be lifted into a basin as they may slip and fall or experience pain from being lifted.

Another disadvantage of using liquid shampoo in combination with wetting an animal is that if an unruly animal escapes from the basin, it creates an additional task of cleaning water, soap, dirt and pet hair from every area to which the pet has traveled.

Another disadvantage of using liquid shampoo in combination with wetting an animal is that the animal will often shake its fur when wet, spraying the caretaker and bathing area with water, shampoo, or flea bath and wasting those substances.

Another disadvantage of using liquid shampoo in combination with wetting an animal is that it creates a stressful situation for many pets and their owners.

Another disadvantage of using liquid shampoo in combination with wetting an animal is that the bathing must take place near a water source and cannot be done spontaneously, at any location.

Another disadvantage of using liquid shampoo in combination with wetting an animal is that it requires more than one product to bathe a pet, including a basin, a liquid shampoo and a towel or drying device.

Another disadvantage of using liquid shampoo in combination with wetting an animal is that it requires a four step process for shampooing: Wetting the animal with water, applying the shampoo, rinsing the pet and then drying the pet with a towel or air dryer.

A disadvantage of cleaning an animal with a spray-on dry shampoo or a spray-on wet shampoo is that of exposing the animal and the caretaker to the fumes of the spray shampoo.

Another disadvantage of cleaning an animal with a spray-on dry shampoo or spray-on wet shampoo is that the caretaker is left with the job of cleaning the towel that is used to rub the shampoo into the coat of the animal and the job of cleaning the pet hair that is left behind.

Another disadvantage of using liquid shampoo in combination with wetting an animal is that it is an especially difficult and messy task with larger animals.

A disadvantage of a reusable pet washing device such as U.S. Pat. No. 3,749,064 is the need to clean the apparatus of pet hair and dirt after the animal has been bathed.

A disadvantage of a reusable pet washing device such as U.S. Pat. No. 4,083,328 is the storage room required to keep the washing apparatus.

A disadvantage of using a wet bath to kill fleas or other parasites is that the animal may not stay in the bath long enough to receive the appropriate amount of treatment.

A disadvantage of applying skin absorptive medicament to an animal is that animals are frequently moving and making it difficult for a caretaker to apply the substance to an animal.

DETAILED DESCRIPTION

Figure 1:
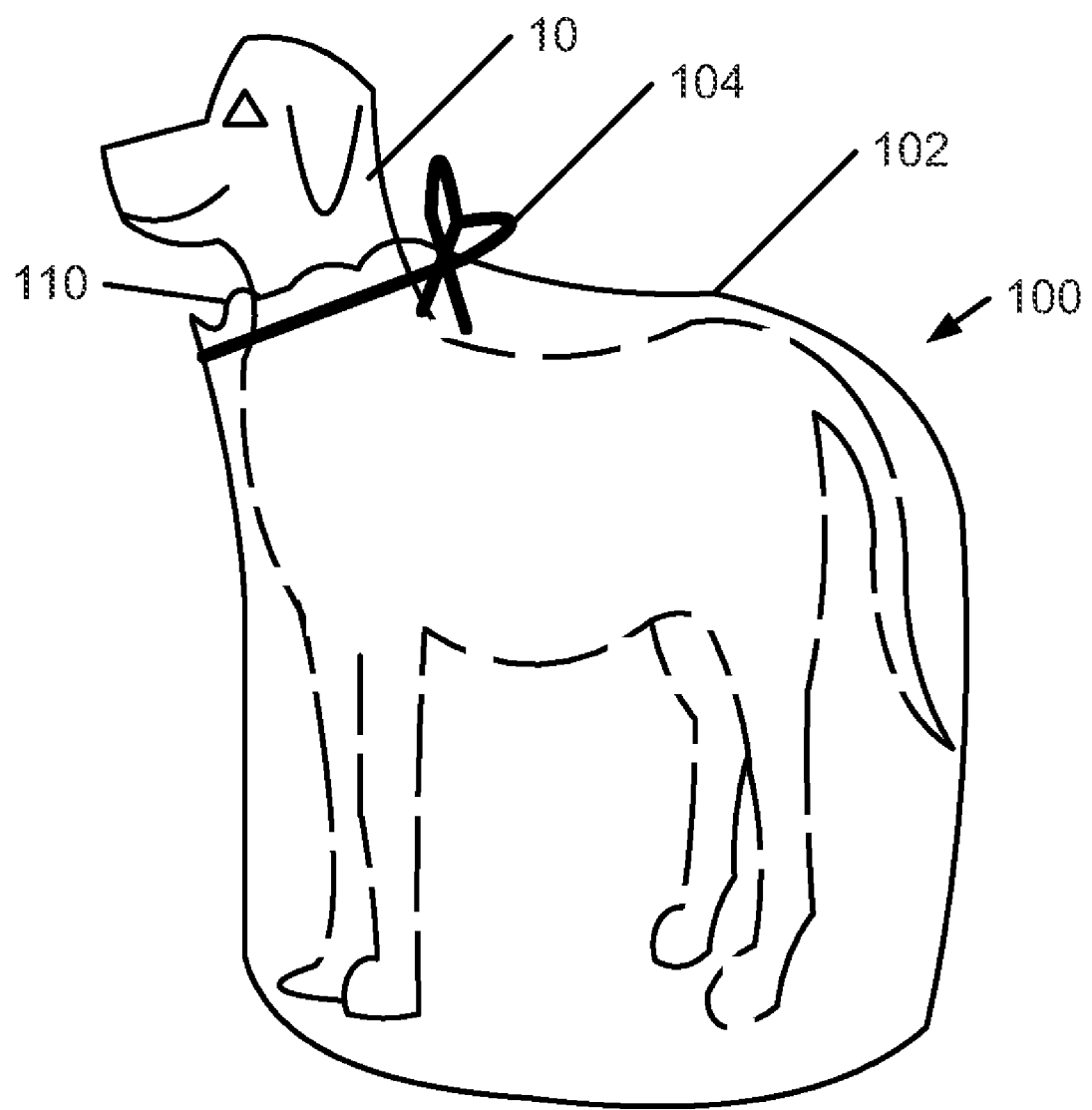
FIG. 1 is a side view of the bag, showing a top opening with a drawstring closure, secured at the neck of an animal in accordance with some embodiments of the present invention.

FIG. 1 is a side view of the bag 100, showing a top opening 110 with a drawstring closure 104, secured at the neck of an animal in accordance with some embodiments of the present invention. The bag is a single use disposable pet cleaning bag that is coated on the inside of a bag surface 302 with dry shampoo 306 (FIG. 3A or FIG. 3B) or pre-moistened with wet shampoo, or coated on the inside with a water-activated shampoo, allowing for a much easier method of cleaning pets 10 while providing a safer, more relaxing experience for the animal and eliminating the required cleanup of the bathing area.

Figure 3A:
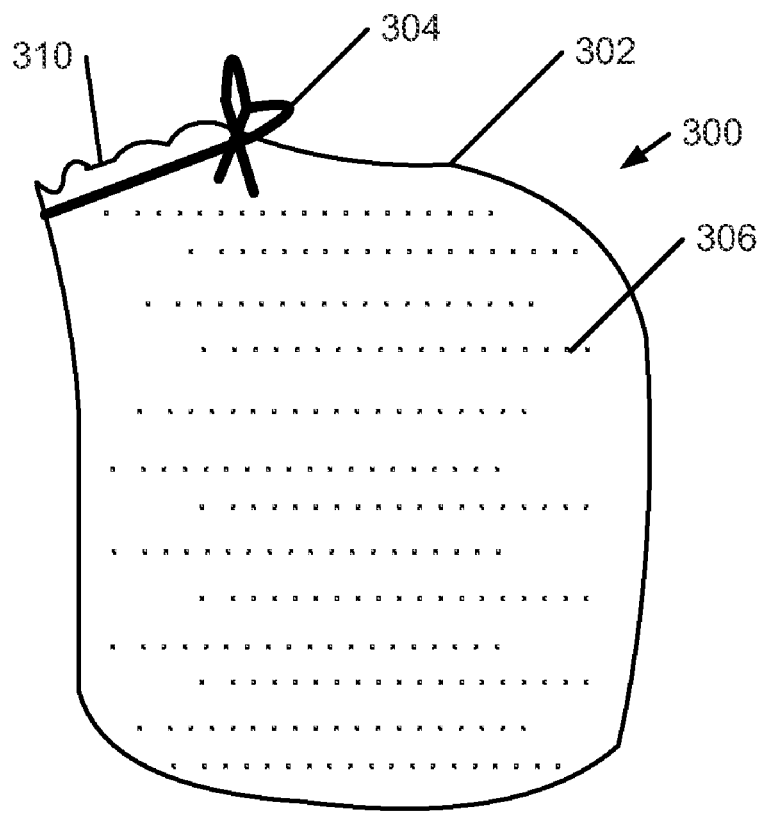
FIG. 3A is a view of the bag of FIG. 1 with a shampoo, represented as dots, coated on the inside of a bag surface in accordance with some embodiments of the present invention.
Figure 3B:
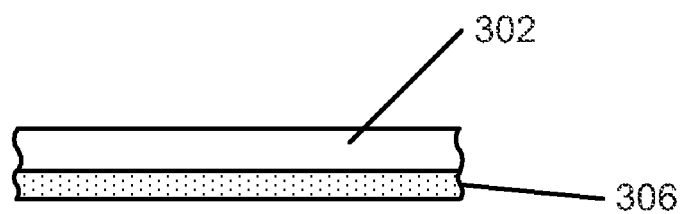
FIG. 3B is a partial view of the bag having the shampoo, represented as dots, coated on the inside of a bag surface in accordance with some embodiments of the present invention.

FIG. 3A is a view of the bag 300 of FIG. 1 with a shampoo 306, represented as dots, coated on the inside of the bag surface 302 in accordance with some embodiments of the present invention. The top opening 310 of bag 300 is shown drawn by drawstring closure 310. FIG. 3B is a partial view of the bag having the shampoo 306 (represented as dots) coated on the inside of the bag surface 302 in accordance with some embodiments of the present invention.

Figure 4:
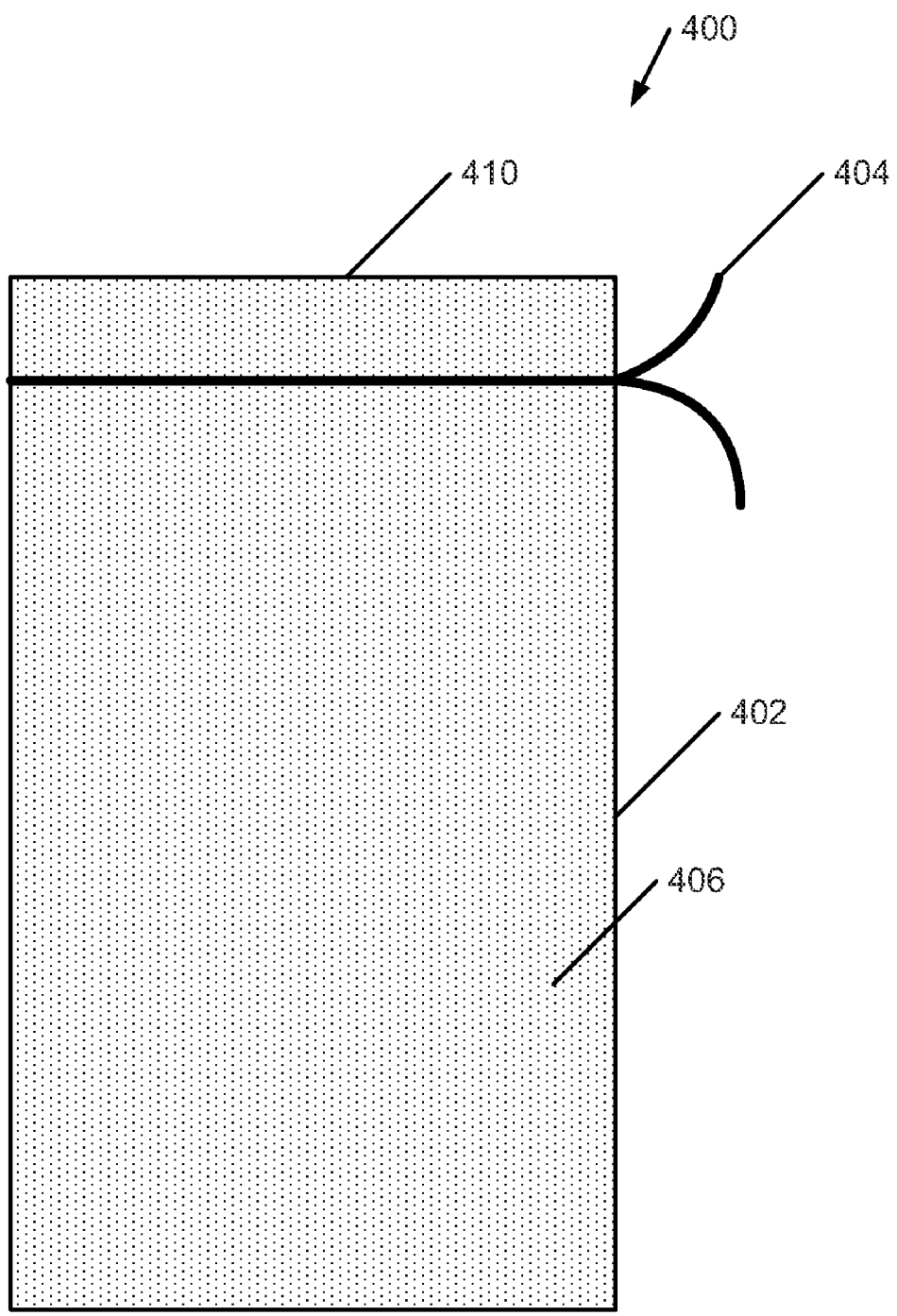
FIG. 4 is a view of a bag of FIG. 1 without an animal in accordance with some embodiments of the present invention.

FIG. 4 is a view of a bag 400 of FIG. 1 without an animal in accordance with some embodiments of the present invention. The bag 400 includes a closure 404 such as a drawstring near the top opening 410. The bag 400 includes a bag surface 402 the inside of which is coated throughout with a shampoo 406.

Figure 2:
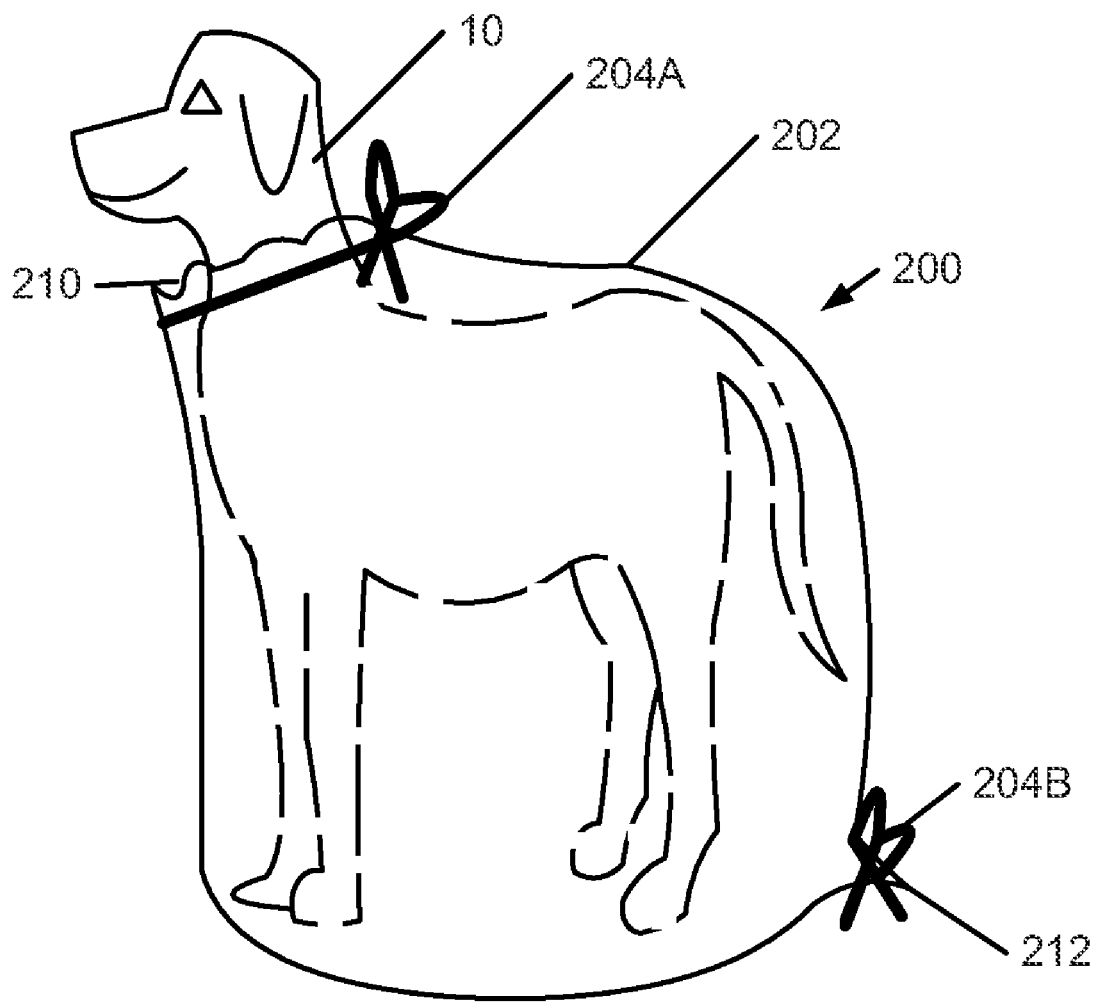
FIG. 2 is a side view of the bag, showing a top opening with a drawstring closure secured at the neck and a bottom bag opening with the drawstring closure secured beyond the feet in accordance with some embodiments of the present invention.

The caretaker places the pet 10 inside the bag 100 and then secures the bag 100 around the neck of the animal. (See FIG. 1) FIG. 2 is a side view of the bag 200, showing a top opening 210 with a drawstring closure 204A secured at the neck and a bottom bag opening 204B with the drawstring closure 212 secured beyond the feet in accordance with some embodiments of the present invention. If the bag 200 is made with a top opening 210 and a bottom opening 212, the bag 200 may be placed over the head of the pet 10, secured around the neck and then pulled over the body and beyond the feet of the animal. (See FIG. 2) The caretaker is then able to clean the pet by gently massaging the shampoo 506 (FIG. 5) into the coat of the animal, creating a relaxing experience for the pet 10. When the cleaning has been completed, the caretaker then removes the bag 100 or 200 which contains the dirt and hair that is shed by the animal and discards the bag 100 or 200. This eliminates the required cleanup of a bathtub, basin or bathing area after the pet 10 has been shampooed.

Figure 5:
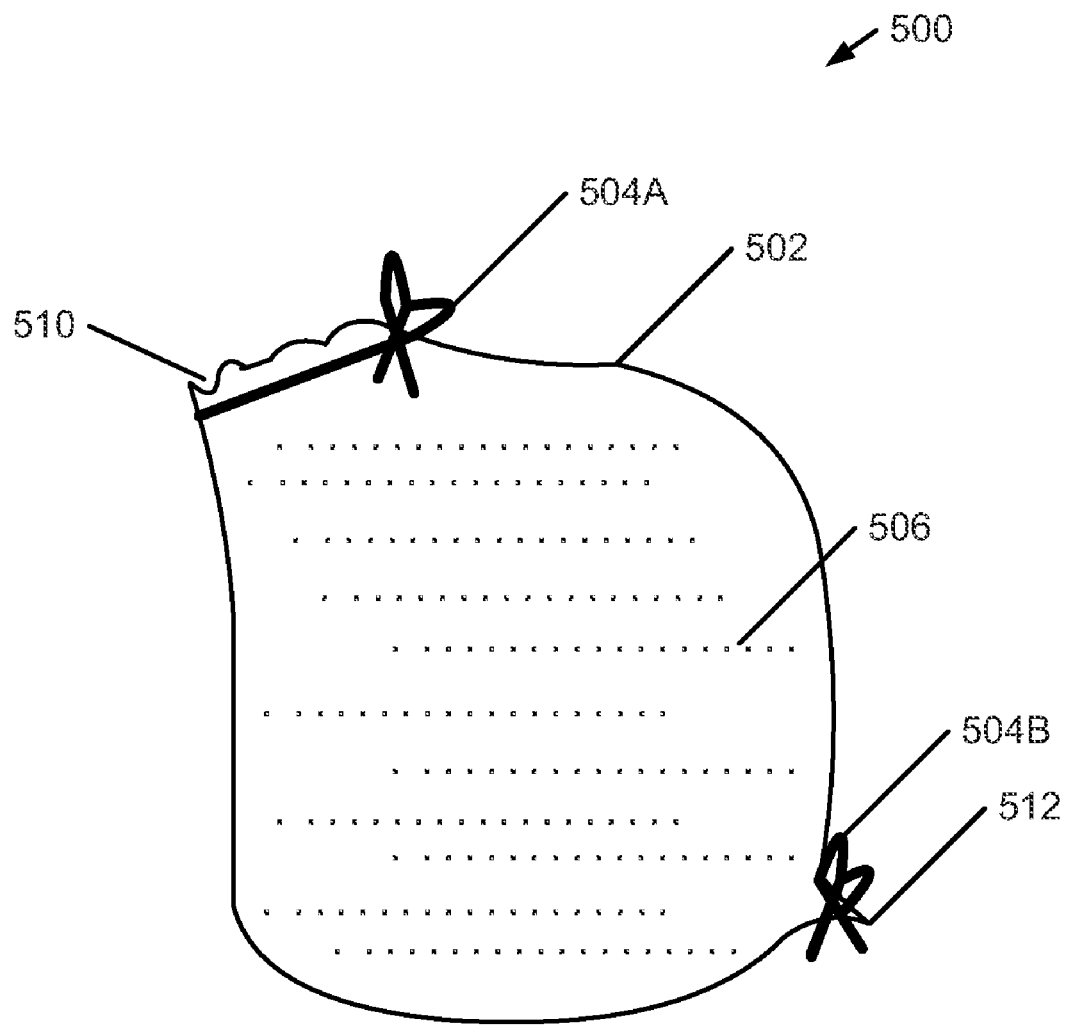
FIG. 5 is a view of the bag of FIG. 2 with a shampoo, represented as dots, coated on the inside a bag surface in accordance with some embodiments of the present invention.

FIG. 5 is a view of the bag 500 of FIG. 2 with a shampoo 506, represented as dots, coated on the inside of surface 502. Bag 500 includes a top opening 510 with a drawstring closure 504A secured at the neck and a bottom bag opening 504B with the drawstring closure 512 to be secured beyond the feet of an animal.

Figure 6A:
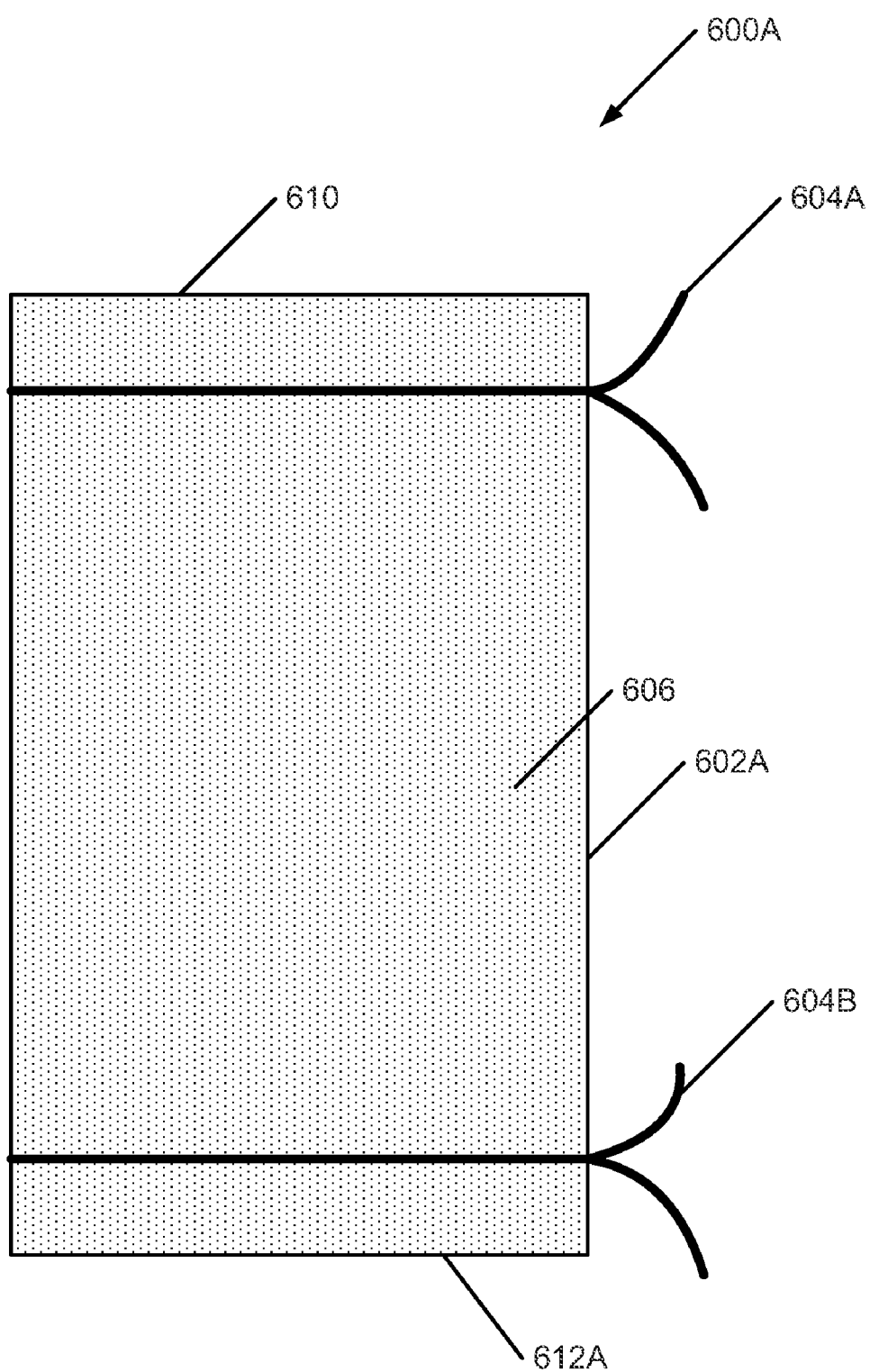
FIG. 6A is a view of a bag of FIG. 2 without an animal in accordance with some embodiments of the present invention.

FIG. 6A is a view of a bag 600A of FIG. 2 without an animal in accordance with some embodiments of the present invention. The bag 600A includes closures 604A and 604B such as a drawstring near the top opening 610 and bottom opening 612A. The bag 600A includes a bag surface 602A the inside of which is coated throughout with a shampoo 606.

Figure 6B:
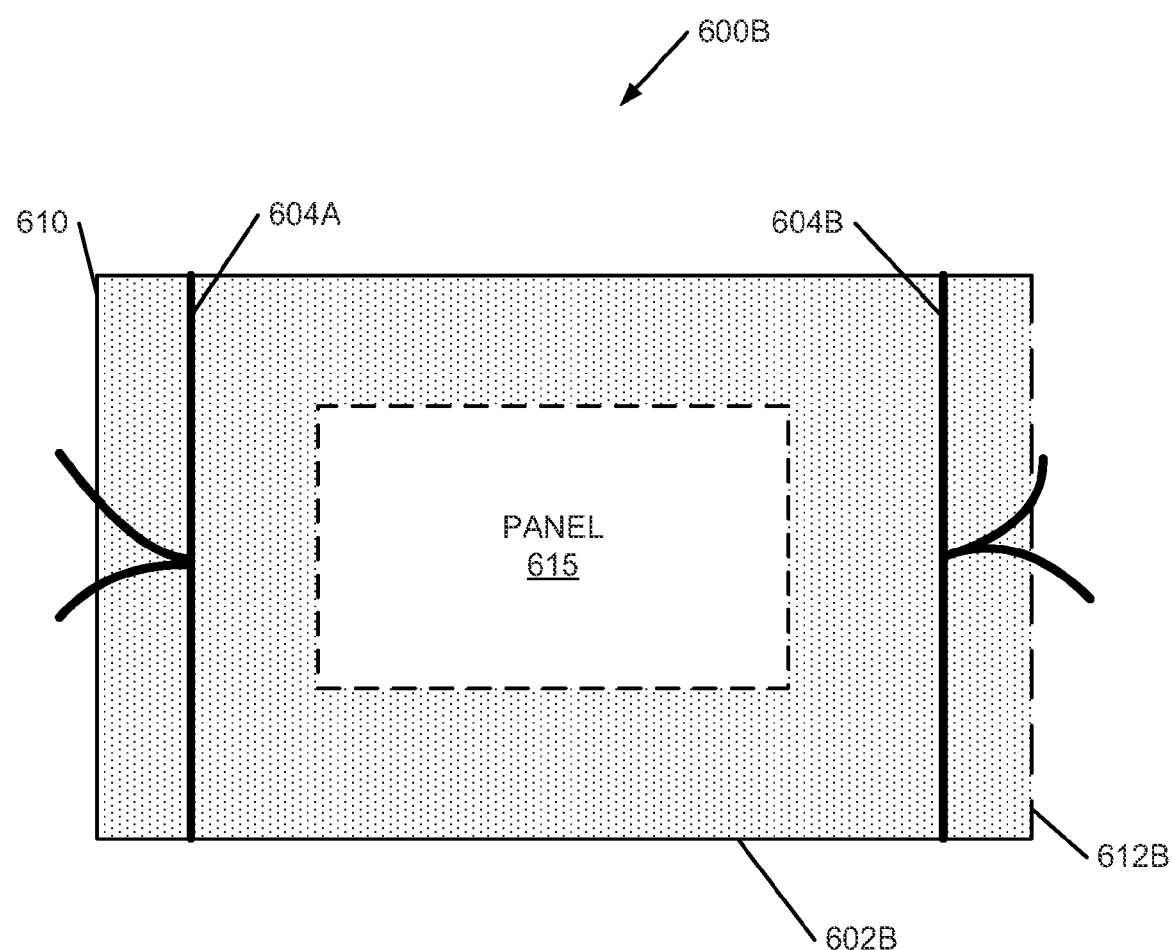
FIG. 6B is a view of a bag of FIG. 2 without an animal and with a panel in accordance with some embodiments of the present invention.

FIG. 6B is a view of a bag 600B without an animal in accordance with some embodiments of the present invention. The bag 600B includes closures 604A and 604B such as a drawstring near the top opening 610 and a perforated hole 612B for placing the bag 600B over the head of the animal. The bag 600B includes a reinforced panel 615 that can be laminated or coated material that is adhered to the surface 602B of the bag 600B in order to make the bag 600B more resistant to tearing such as caused by the animal's claws. The perforated hole 612B is represented as a dashed line to denote a perforation. The bag 600B includes a bag surface 602B the inside of which is coated with a shampoo represented by the dots.

The bag 100 or 200 may be coated on the inside with a dry shampoo 306 or 506, respectively, it may be pre-moistened with a wet shampoo, or it may be coated on the inside with a water-activated shampoo.

The disposable bag 100 or 200 that is coated with a dry shampoo 306 (FIG. 3A or FIG. 3B) or 506 (FIG. 5) will not require water in order to clean the coat of the animal. The animal is placed into the bag 100 or the bag 200 may be placed over the animal, the bag is secured with a drawstring closure or any type of closure and the caretaker gently massages the dry shampoo 306 or 506 on the inside of the bag into the coat of the animal. In this process, the animal is cleaned and massaged in a relaxing manner and the dirt and loose pet hair are collected within the bag. After the animal has been cleaned, the bag containing the pet hair and debris is removed from the pet and thrown away.

The disposable bag 100 or 200 that is pre-moistened with a wet shampoo solution will not require a separate water source to clean the coat of the animal. The bag may be packaged in any type of airtight container that will keep it moist. The animal is placed into the bag 100 or the bag 200 may be placed over the animal, the bag 100 or 200 is secured with a drawstring closure or any type of closure and the caretaker gently massages the wet shampoo into the coat of the animal. The bag is pre-moistened with the appropriate amount of wet shampoo such that it is moist enough to clean the pet and allow for a damp-dry rubbing to remove dirt and excess hair. After the animal has been cleaned, the bag containing the dirt and pet hair is removed from the animal and thrown away.

The disposable bag 100 or 200 that is coated on the inside with a water-activated shampoo allows the caretaker to bathe the pet 10 with a water source while eliminating the need to clean the bathing area after the bathing has been completed. The animal is placed into the bag 100 or the bag 200 is placed over the animal, water is poured onto the animal's coat before the opening at the neck is secured. The bag 100 or 200 is then secured with a drawstring type closure or any type closure. As the caretaker gently massages the pet, the shampoo on the inside of the bag is transferred onto the wet coat of the pet and is activated. The shampoo can then be rinsed off the animal by pouring water through the opening at the neck while the pet is still in the bag. After the shampoo is rinsed from the animal and the water drains through the fibers of the bag, the bag which contains the dirt and pet hair is then removed from the pet and discarded.

An advantage of the disposable cleaning bag 100 or 200 that is made with a dry shampoo 306 (FIG. 3A or FIG. 3B) or 506 (FIG. 5) or a disposable bag that is pre-moistened with a wet shampoo is that it's possible for the caretaker to clean the animal at any location. The cleaning does not have to take place near a water source.

Another advantage of the disposable cleaning bag 100 or 200 that is made with a dry shampoo 306 (FIG. 3A or FIG. 3B) or 506 (FIG. 5) or a disposable bag that is pre-moistened with a wet shampoo or a disposable bag that is made with a water-activated shampoo is that cleanup of the bathing area and towel is eliminated.

Another advantage of a disposable pet cleaning bag 100 or 200 that is pre-moistened with a wet shampoo is that it automatically collects the hair of the animal within the bag, eliminating the need to collect any loose hair that falls from an animal while using a standard type of pet wipe or pet wipe mitten.

Another advantage of the disposable cleaning bag 100 or 200 that is made with a dry shampoo 306 (FIG. 3A or FIG. 3B) or 506 (FIG. 5) or a disposable bag that is pre-moistened with a wet shampoo is that only one item is required to clean the animal, eliminating the need for several products such as liquid shampoo, water, basin and towel or air drying device.

Another advantage of the disposable cleaning bag 100 or 200 that is made with a dry shampoo 306 (FIG. 3A or FIG. 3B) or 506 (FIG. 5) or a disposable bag that is pre-moistened with a wet shampoo is that airborne fumes from standard spray-on dry or spray-on wet shampoos are eliminated.

Another advantage of the disposable cleaning bag 100 or 200 that is made with a dry shampoo 306 (FIG. 3A or FIG. 3B) or 506 (FIG. 5) or a disposable bag that is pre-moistened with a wet shampoo or a disposable bag that is made with a water-activated shampoo is that it keeps the animal contained while the cleaning occurs, eliminating the danger of an unruly animal slipping and falling or scratching the care taker if trying to escape from a bathtub or basin.

Another advantage of the disposable cleaning bag 100 or 200 that is made with a dry shampoo 306 (FIG. 3A or FIG. 3B) or 506 (FIG. 5) or a disposable bag that is pre-moistened with a wet shampoo or a disposable bag that is made with a water-activated shampoo is that the animal is less stressed during bathing process because it receives a relaxing massage from the caretaker while the shampoo is being transferred from the bag onto the coat of the animal.

Another advantage of the disposable cleaning bag 100 or 200 that is made with a dry shampoo or a disposable bag that is pre-moistened with a wet shampoo or a disposable bag that is made with a water-activated shampoo is that the bag provides a much safer and gentler way of shampooing geriatric animals, eliminating the possibility of slipping and falling and the pain caused by lifting geriatric pets into and out of a washing basin.

Another advantage of the disposable cleaning bag 100 or 200 that is made with a dry shampoo or a disposable bag that is pre-moistened with a wet shampoo or a disposable bag that is made with a water-activated shampoo is that it's very easy to place the bag on the animal. Form fitted designs shown in U.S. Pat. No. 3,150,641, U.S. Pat. No. 2,408,575 and U.S. Pat. No. 1,562,318 are difficult to use.

Another advantage of the disposable bag 100 or 200 that is made with a dry shampoo or a disposable bag that is pre-moistened with a wet shampoo or a disposable bag that is made with a water-activated shampoo is that the bag encompasses the body and paws of the animal for cleaning. The paws are not encompassed in U.S. Pat. No. 5,060,597. U.S. Pat. No. 3,596,636 is not a single use and disposable bag.

Another advantage of the disposable pet cleaning bag 100 or 200 is that it may be made in any size to fit any size pet within the appropriate ratio of the bag size to the size of the animal.

The disposable bag 100 or 200 can also be made with a dry, pre-moistened, or water-activated pest control agent or medicament. U.S. Pat. No. 2,033,357 and U.S. Pat. No. 3,108,568 are not single use and disposable bags.

Another advantage of the disposable cleaning bag 100 or 200 that is made with a dry shampoo or a disposable bag that is pre-moistened with a wet shampoo or a disposable bag that is made with a water-activated shampoo is that it prevents the animal from shaking its fur during shampooing or a flea bath or medicament and it also protects the caretaker from the spray created by the animal shaking its fur.

Figure 8:
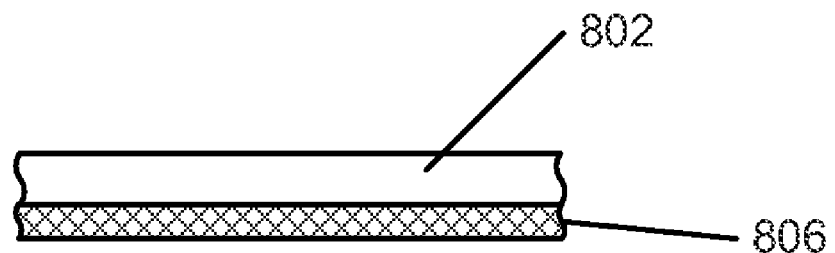
FIG. 8 is a partial view of a bag with a substance in accordance with some embodiments of the present invention.

FIG. 8 is a partial view of a bag with a substance 806 coated on a bag surface 802 in accordance with some embodiments of the present invention. The substance 806 is represented as a cross hatch pattern and may be coated on the inside of the bag surface 802. The substance 806 may include a dry shampoo, a water-activated shampoo or a wet shampoo on the inside or throughout the bag. Furthermore, the substance 806 may be a pest control agent, a medicament, a conditioner or a wetness absorbing material.

Another advantage of the disposable bag 100 or 200 that is made with a dry, pre-moistened or a water-activated skin absorptive medicament or pest control agent is that it keeps the animal contained during the application so that the animal can receive the appropriate amount of the substance being transferred from the bag onto the animal.

Another advantage of the disposable bag that is made with a dry, pre-moistened, or water-activated shampoo, medicament or pest control agent is that it can be used on domestic pets, livestock, or any animals.

An advantage of the water-activated pet cleaning bag that is made with a spun bonded or an appropriate type of disposable material is that it allows water to pass through it while trapping the pet hair and debris, eliminating the need to add a draining screen to the bag design such as U.S. Pat. No. 4,083,328.

The disposable bag may be made of a spun bonded material or any appropriate type of material that allows for the coating of the inside of the bag with various types of shampoos. The pre-moistened disposable bag may be made of spun bonded or any type of material that may be pre-moistened with a wet shampoo.

The disposable pet cleaning bag 100 or 200 may be made with a single top opening (FIG. 1) or a top and a bottom opening (FIG. 2).

The disposable cleaning bag 600B may also be made with a perforated hole 612B for placing over the head of the animal and a reinforced panel 615 that can be a laminated or coated material and adhered to the bag in order to make the bag more resistant to tearing that may be caused by the animal's claws.

Figure 9A:
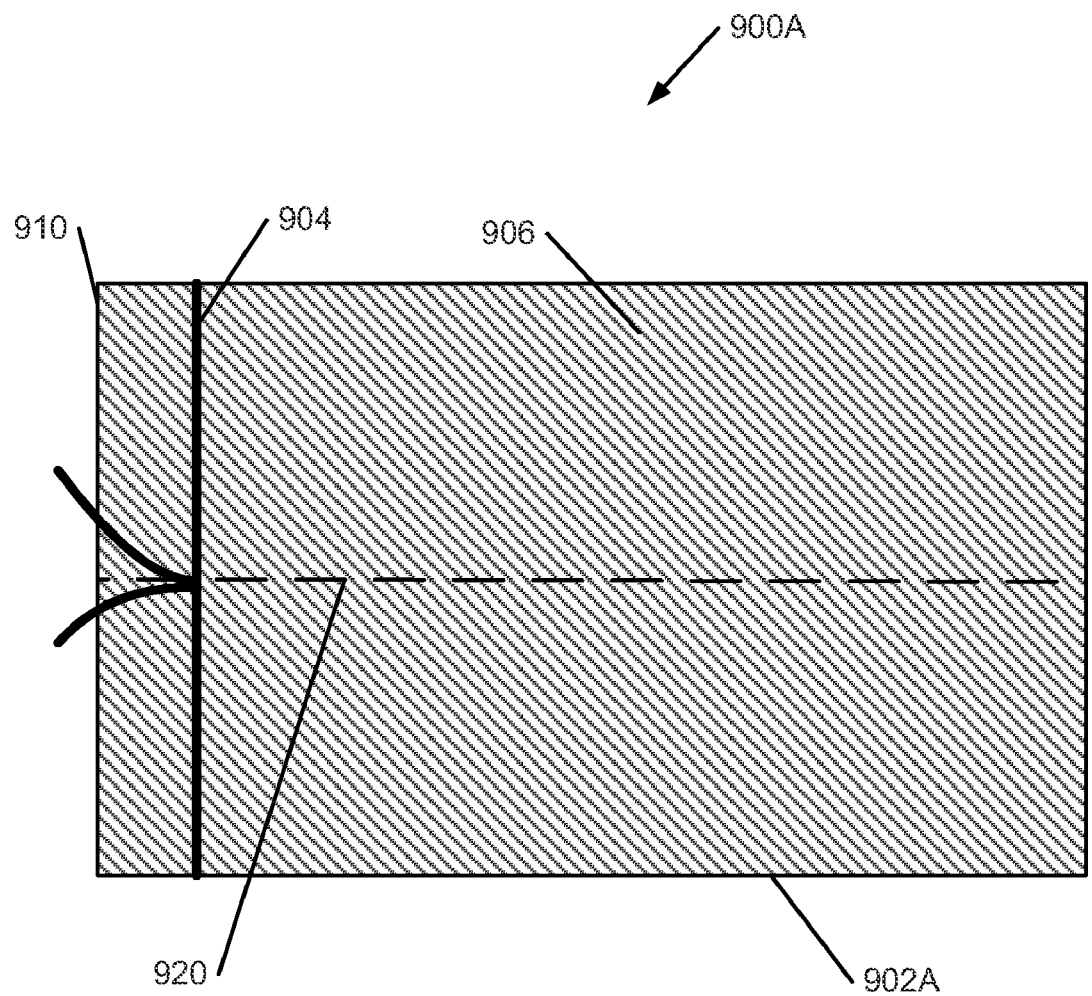
FIG. 9A is a view of a first multilayer bag with a perforation represented by a dashed line in accordance with some embodiments of the present invention.

FIG. 9A is a view of a first multilayer bag 900A with a perforation 920, represented by a dashed line, in accordance with some embodiments of the present invention. The bag 900A includes a closure 904 such as a drawstring near the top opening 910. The bag 900A has an outside bag layer 902A. The inside surface of bag layer 902A has coated therein a wetness absorbing material 906, represented in a diagonal hatch pattern.

Figure 7:
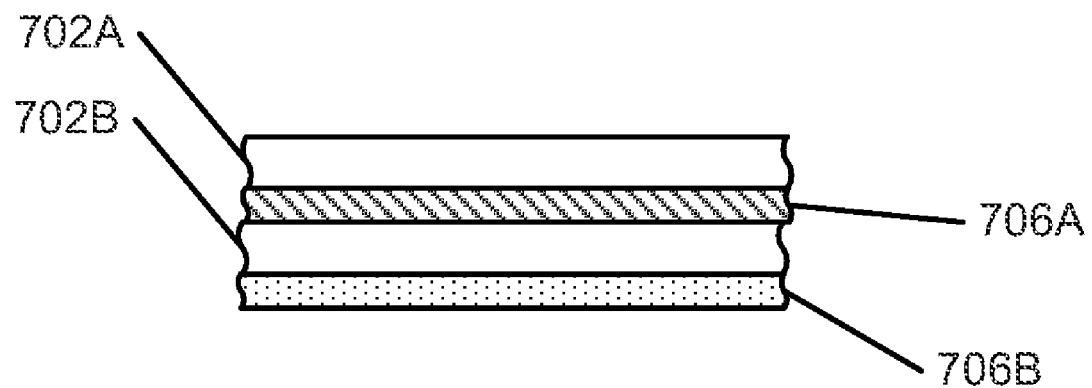
FIG. 7 is a partial view of a multilayer bag in accordance with some embodiments of the present invention.

Referring also to FIG. 7 a partial view of a multilayer bag (such as bag 900A) in accordance with some embodiments of the present invention is shown. The bag is made with multiple layers 702A and 702B that are perforated via perforation 920 so that the inside bag layer 702B, containing the water-activated shampoo 706B coated thereon may be removed when the shampooing is completed. The remaining (outside) bag layer 702A may be coated with a wetness absorbing material 706A and used as a drying bag, represented in a diagonal hatch pattern.

Figure 9B:
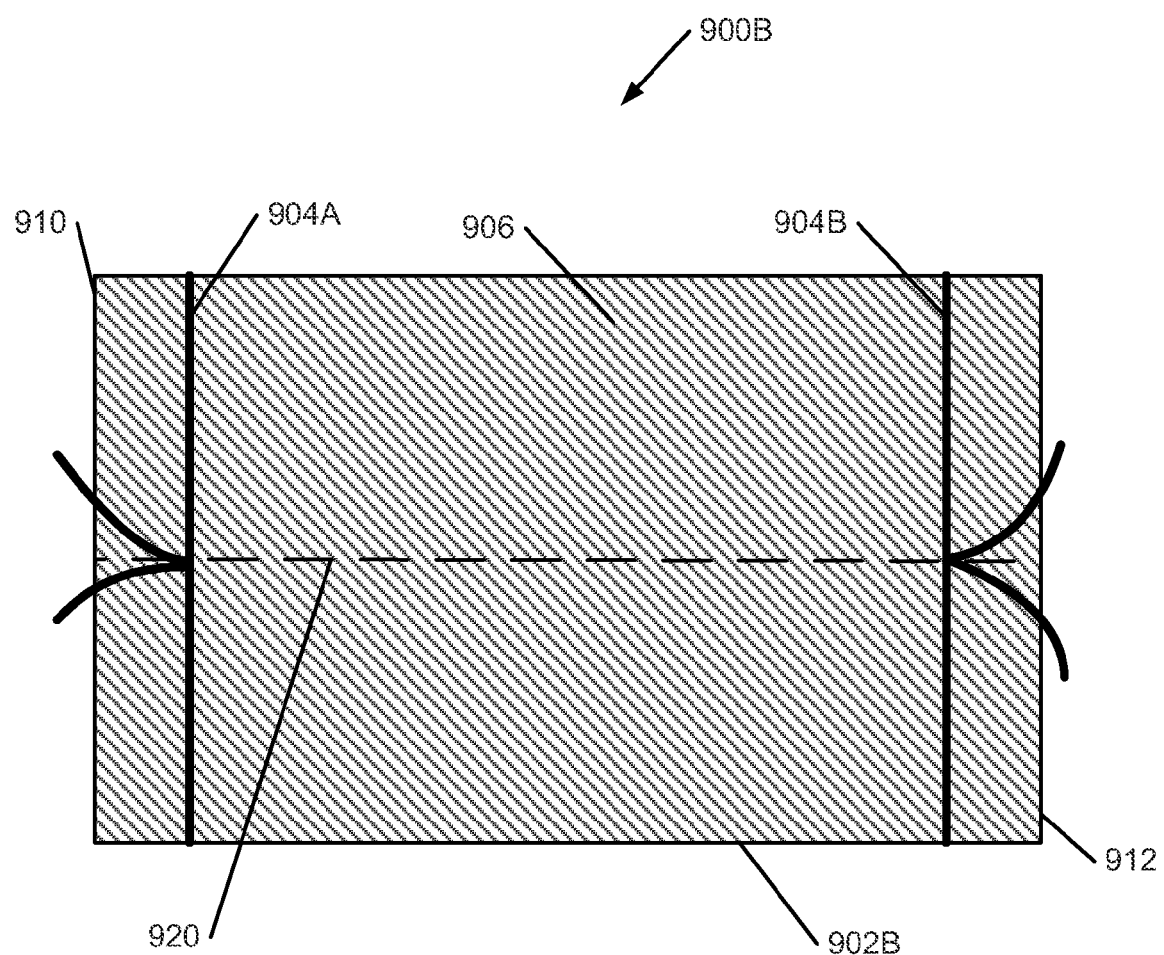
FIG. 9B is a view of a second multilayer bag with a perforation represented by a dashed line in accordance with some embodiments of the present invention.

FIG. 9B is a view of a second multilayer bag 900B with a perforation 920 represented by a dashed line in accordance with some embodiments of the present invention. The multilayer bag 900B includes closures 904A and 9004B such as a drawstring near the top opening 910 and bottom opening 912. The bag 900A has an outside bag layer 902B. The inside surface of bag layer 902B has coated therein a wetness absorbing material 906, represented in a diagonal hatch pattern.

The disposable cleaning bag may also be made with multiple layers that are perforated so that the inside bag with the shampoo coating may be removed when shampooing is completed and the remaining bag layer may be coated with an absorbing material and used as a drying bag.

The disposable bag may also be made with an absorbing material and/or a conditioner so that it may be used to dry the animal, condition the fur and collect the extra pet hair and dispose of the bag after use. U.S. Pat. No. 7,381,203 B2 is an example of liquid retentive materials.

The disposable bag may also be made of any type of material that would create a slight texture and/or a slight adhesive characteristic that would aid in the cleaning of the animal.

The inside of the disposable pet cleaning bag may also be coated with liquid packets of shampoo and/or conditioner that break open or dissolve into the coat of the animal when the pet is being massaged while inside the bag.

The shampoo in the disposable pet cleaning bag may include various scents.

The disposable pet cleaning bag may be secured at the neck and beyond the feet with a drawstring closure, adhesive closure, or any type of closure.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

All sited patents are hereby incorporated by reference into the instant specification.

What is claimed is:

1. A device comprising:
   a bag having a top opening, an inside bag surface and an outside bag surface, the inside bag surface being coated with a dry shampoo or a water-activated shampoo or being pre-moistened with a wet shampoo and the bag adapted for shampooing; and
   a top closure configured to close or reduce a size of the top opening.

2. The device according to claim 1, further comprising:
   a bottom opening; and
   a bottom closure configured to close or reduce a size of the bottom opening wherein the bag may be placed over a head of an animal, secured around a neck with the top closure and pulled over a body and beyond feet of the animal to enclose the body and feet of the animal, and wherein the bag is adapted to shampoo the animal within the bag with the dry shampoo, the water-activated shampoo or the wet shampoo.

3. The device according to claim 2, wherein the top closure and the bottom closure each comprises a drawstring closure or an adhesive closure.

4. The device according to claim 1, wherein the bag is disposable and configured to receive an animal's body and wherein the closure is configured to secure the bag around an animal's neck.

5. The device according to claim 4, wherein the bag is configured to capture dirt and animal hair wherein the animal's body and the feet are enclosed in the bag.

6. The device according to claim 1, wherein the bag is made of a material that allows for coating of the dry shampoo, the water-activated shampoo or the wet shampoo on the inside bag surface of the bag.

7. The device according to claim 6, wherein the material includes fibers, the material being configured to allow drainage of water through the fibers of the bag.

8. The device according to claim 1, wherein the bag is configured to capture water or hair flung during shampooing within the bag.

9. The device according to claim 1, wherein the bag comprises a perforated hole for placing the bag over a head of an animal.

10. The device according to claim 1, further comprising:
    a reinforced panel laminated to, adhered to or coated on the bag in order to make the bag more resistant to tearing that may be caused by claws of the animal.

11. The device according to claim 1, wherein the bag comprises:
    multiple layers that are perforated, the multiple layers comprise:
    an inside bag layer containing the water-activated shampoo configured to be removed when shampooing is completed; and
    a remaining bag layer coated with a wetness absorbing material for a drying.

12. The device according to claim 1, wherein the dry shampoo, the water-activated shampoo or the wet shampoo being configured for use on domestic pets, livestock, or animals.

13. The device according to claim 12, wherein the bag is a single use and disposable bag.

14. A device comprising:
    a bag having a top opening, an inside bag surface and an outside bag surface, the inside bag surface coated with a medicament, a conditioner treatment or a wetness absorbing material for drying; and
    a closure configured to close or reduce a size of the top opening.

15. The device according to claim 14, further comprising:
    a bottom opening; and
    a bottom closure configured to close or reduce a size of the bottom opening, wherein the bag may be placed over a head of an animal, secured around a neck and then pulled over a body and beyond feet of the animal, and wherein the bag is adapted to apply to the animal within the bag the medicament, the conditioner treatment or the wetness absorbing material.

16. The device according to claim 15, wherein said closure and said bottom closure each comprises a drawstring closure or an adhesive closure.

17. The device according to claim 14, wherein the bag is a single use and disposable bag.

* * * * *